United States Patent
Moon

(10) Patent No.: US 6,474,812 B1
(45) Date of Patent: Nov. 5, 2002

(54) STRUCTURE FOR ASSEMBLING AUXILIARY SPECTACLES WITH MAIN SPECTACLES BY MEANS OF MAGNETIC CLIPS

(75) Inventor: Won Il Moon, Daegu (KR)

(73) Assignees: Kyung-Nam Kim (KR); Kwang-Nam Kim, Miami, FL (US)

( * ) Notice: Subject to any disclaimer, the term of this patent is extended or adjusted under 35 U.S.C. 154(b) by 0 days.

(21) Appl. No.: 10/106,967

(22) Filed: Mar. 26, 2002

(30) Foreign Application Priority Data

Sep. 19, 2001 (KR) .............................. 01-28898

(51) Int. Cl.[7] .............................................. G02C 9/00
(52) U.S. Cl. ........................................ 351/47; 351/57
(58) Field of Search .......................... 351/47, 48, 57, 351/58, 41, 44, 158

(56) References Cited

U.S. PATENT DOCUMENTS 6,116,730 A  *  9/2000  Kwok ......................... 351/47

6,343,858 B1  *  2/2002  Zelman ....................... 351/47

* cited by examiner

Primary Examiner—Hung Xuan Dang
(74) Attorney, Agent, or Firm—Galgano & Burke

(57) ABSTRACT

Disclosed is a structure for assembling auxiliary spectacles with main spectacles by means of magnetic clips, in which the auxiliary spectacles are not easily separated from the main spectacles after the auxiliary spectacles are attached to the main spectacles. The structure has: at least a magnetic clip including a first magnetic portion and an assembling arm integrated with the first magnetic portion, the first magnetic portion containing a first magnet, the assembling arm having a first assembling hole formed through the assembling arm, the magnetic clip being assembled with the main spectacles by means of an assembling screw; and at least a magnetic attachment member having a first end, at which a second magnetic portion is disposed, and a second end integrated with the auxiliary spectacles, the second magnetic portion containing a second magnet, so that the auxiliary spectacles can be attached to the main spectacles by means of an attraction between the first magnet and the second magnet.

4 Claims, 5 Drawing Sheets

– PRIOR ART –

STRUCTURE FOR ASSEMBLING AUXILIARY SPECTACLES WITH MAIN SPECTACLES BY MEANS OF MAGNETIC CLIPS

BACKGROUND OF THE INVENTION

1. Field of the Invention

The present invention relates to a structure for assembling auxiliary spectacles with main spectacles by means of magnetic clips, which has relatively a simple construction and enables the spectacles to maintain a neat appearance, by which the auxiliary spectacles can be easily attached to the main spectacles through a simple operation of attaching the auxiliary spectacles to the main spectacles, and in which the auxiliary spectacles are not easily separated from the main spectacles after the auxiliary spectacles are attached to the main spectacles.

2. Description of the Prior Art

As is well known, people wear spectacles in order to correct their eyesight. Normally, they wear spectacles with transparent lenses 1 which are either slightly tinged or have no color at all.

In the meantime, people wear sunglasses 11 tinged with a desired color in order to protect their eyes from the ultraviolet rays of the blazing sun, to secure their visual field under the glaring sunlight, or to look fashionable, regardless of the correction of their eyesight.

In this case, one who does normally without spectacles may be just wearing sunglasses of which he is in possession, while one who uses spectacles for correcting eyesight has the problem of having to wear sunglasses with a proper diopter instead of wearing his own spectacles.

To solve this problem, double spectacles have been proposed that consist of corrective spectacles which are overlapped in the front by and fastened with auxiliary spectacles which may function as sunglasses with a desired color tinge, and using a magnet is known as the most common and effective way to produce this result.

Such double spectacles, however, have to be specially and separately made from the beginning of their fabrication so as to obtain the above-mentioned purpose.

Therefore, one who wears general corrective spectacles without a connecting magnet has a disadvantage, in that he has to buy separate sunglasses or double spectacles having been fabricated separately.

In order to solve this problem, another double spectacles as shown in FIG. 1 has been proposed. In the double spectacles, a magnetic core 7 is disposed on and protrudes upward from a connector 3 of existing spectacles for the correction of eyesight, and a magnetic attachment member 4 of the sunglasses 11 is placed on and assembled with the magnetic core 7 by means of a magnetic force between them. In this case, in order to place and assemble the magnetic attachment member 4 of the sunglasses 11 on and with the magnetic core 7 protruding upward from the connector 3, the magnetic attachment member 4 is formed to have a shape such that the magnetic attachment member 4 is bent upward.

That is, it is inevitable to bend the magnetic attachment member 4 upward, in order to place the magnetic attachment member 4, which extends from a frame 2a of the sunglasses 11, on the connector 3, and to attach the magnetic attachment member 4 to the magnetic core 7 protruding from the connector 3.

Therefore, when a user widens the temples 10 more widely than a critical widened angle of the temples 10, the connectors 3 are also widened due to their elasticity, so that the contact surfaces of the magnetic core 7 and the magnetic attachment member 4 go away from each other.

In this case, since the magnetic core 7 and the magnetic attachment member 4 are made from magnets, they are maintained in contact with each other at their normal positions, while they can be easily separated from their positions due to the change in the directions of their magnetic force after they get out of their normal positions.

Further, in the disclosed double spectacles, the assembly between the magnetic attachment member 4 and the magnetic core 7 of the connector 3 makes their construction very complicated, thereby deteriorating their appearance.

Moreover, as shown by the encircled portion in FIG. 1, the magnetic core 7 is integrated with an upper end of a screw, so that a screwdriver cannot be used but a hand or other tools than the screwdriver have to be used in assembling the magnetic core 7. Moreover, the assembling strength also inevitably decreases.

SUMMARY OF THE INVENTION

Accordingly, the present invention has been made to solve the above-mentioned problems occurring in the prior art, and an object of the present invention is to provide a structure for assembling auxiliary spectacles with main spectacles by means of magnetic clips, by which the auxiliary spectacles can be easily attached to the main spectacles through a simple operation of attaching the auxiliary spectacles to the main spectacles.

It is another object of the present invention to provide a structure for assembling auxiliary spectacles with main spectacles by means of magnetic clips, which has relatively a simple construction and enables the spectacles to maintain a neat appearance.

It is another object of the present invention to provide a structure for assembling auxiliary spectacles with main spectacles by means of magnetic clips, in which the auxiliary spectacles are not easily separated from the main spectacles after the auxiliary spectacles are attached to the main spectacles.

In order to accomplish this object, there is provided a structure for assembling auxiliary spectacles with main spectacles by means of magnetic clips, the structure comprising: at least a magnetic clip including a first magnetic portion and an assembling arm integrated with the first magnetic portion, the first magnetic portion containing a first magnet, the assembling arm having a first assembling hole formed through the assembling arm, the magnetic clip being assembled with the main spectacles by means of an assembling screw; and at least a magnetic attachment member having a first end, at which a second magnetic portion is disposed, and a second end integrated with the auxiliary spectacles, the second magnetic portion containing a second magnet, so that the auxiliary spectacles can be attached to the main spectacles by means of an attraction between the first magnet and the second magnet.

In the structure for assembling auxiliary spectacles with main spectacles by means of magnetic clips, the magnetic clip may be assembled by means of the assembling screw, which is screwed through the first assembling hole and a hinge hole, the hinge hole being formed through a hinge section of a connector between a temple and a lens frame of the main spectacles. In this case, the assembling screw may be screwed through the first assembling hole and a frame clamp hole, which is formed through a frame clamp of a connector between a temple and a lens frame of the main spectacles, which clamps a lens frame of the main spectacles.

It is preferred that the first magnetic portion of the magnetic clip has a shape fitting to a space between the hinge section and the frame clamp, and the first magnetic portion has a height equal to or smaller than a width of the temple of the main spectacles, thereby preventing the first magnetic portion from protruding vertically out of the temple.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
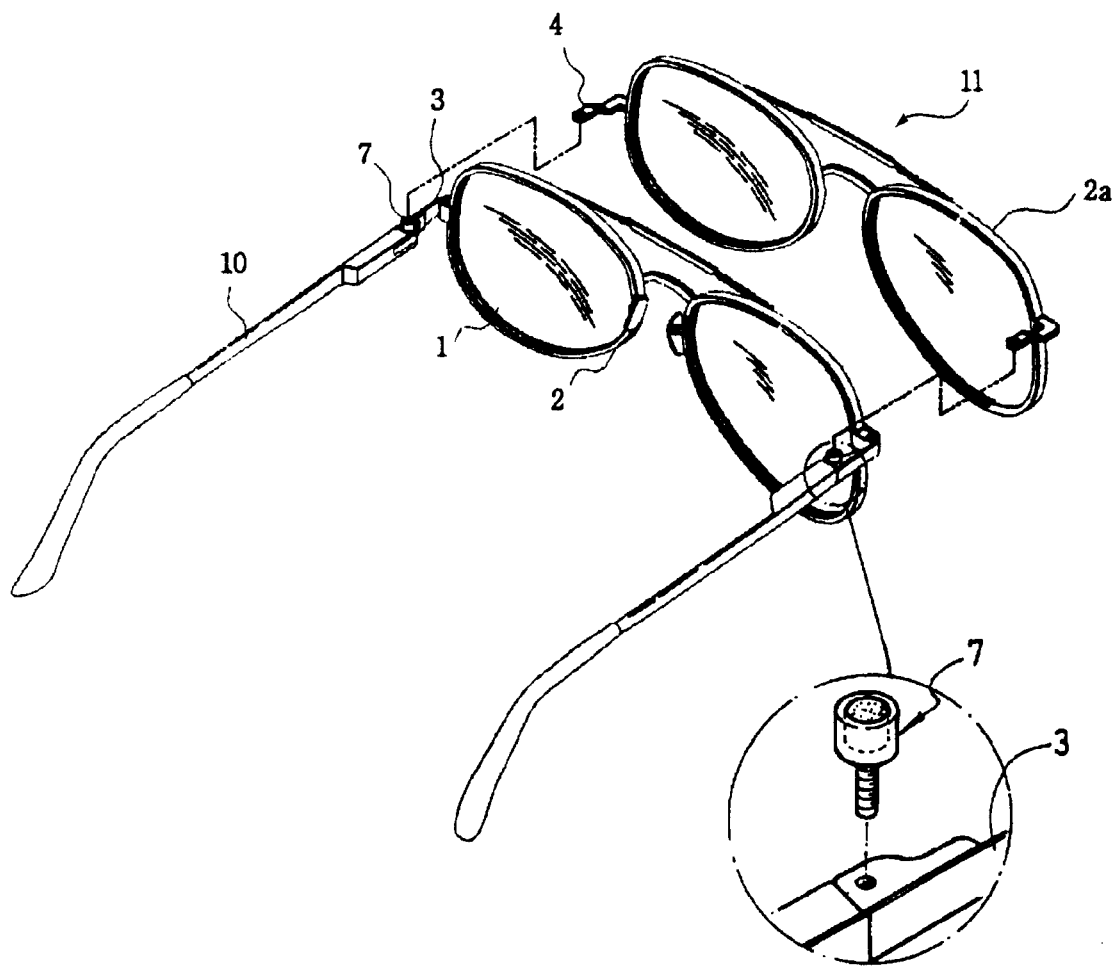
FIG. 1 is an exploded perspective view of general double spectacles, in which main spectacles and auxiliary spectacles are assembled through a conventional assembling structure.

Hereinafter, a preferred embodiment of the present invention will be described with reference to the accompanying drawings.

A structure for assembling auxiliary spectacles with main spectacles by means of magnetic clips according to the present invention includes at least a magnetic clip 20 and 30 and at least a magnetic attachment member 61. The magnetic clip 20 and 30 includes a first magnetic portion 22 and 32 and an assembling arm 21 and 31 integrated with the first magnetic portion 22 and 32. The first magnetic portion contains a first magnet. The assembling arm 21 and 31 has a first assembling hole 21' and 31' formed through the assembling arm 21 and 31.

One end of the magnetic attachment member 61 is integrated with the auxiliary spectacles, and a second magnetic portion 62 is disposed at the other end of the magnet attachment member 61. Therefore, the auxiliary spectacles can be attached to the main spectacles by means of an attraction between the first magnet and the second magnet.

Figure 2A:
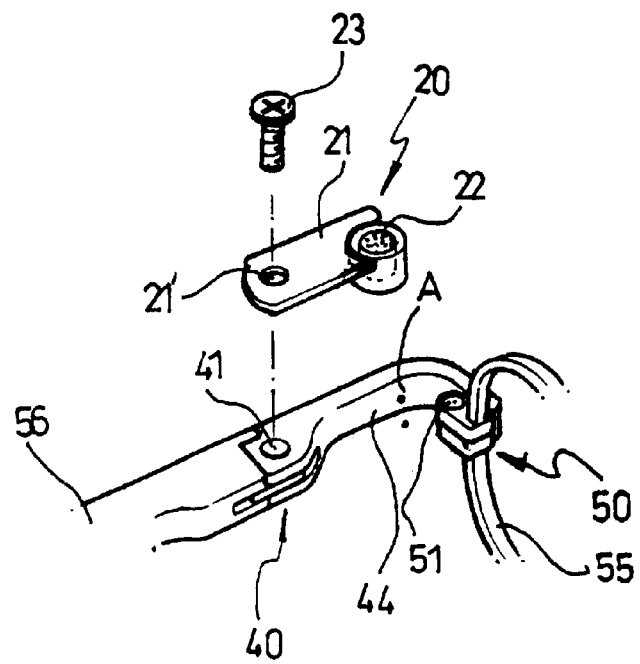
FIG. 2A is a perspective view of a structure for assembling auxiliary spectacles with main spectacles by means of magnetic clips according to an embodiment of the present invention, showing a state in which a magnetic clip is assembled with a hinge section.
Figure 2B:
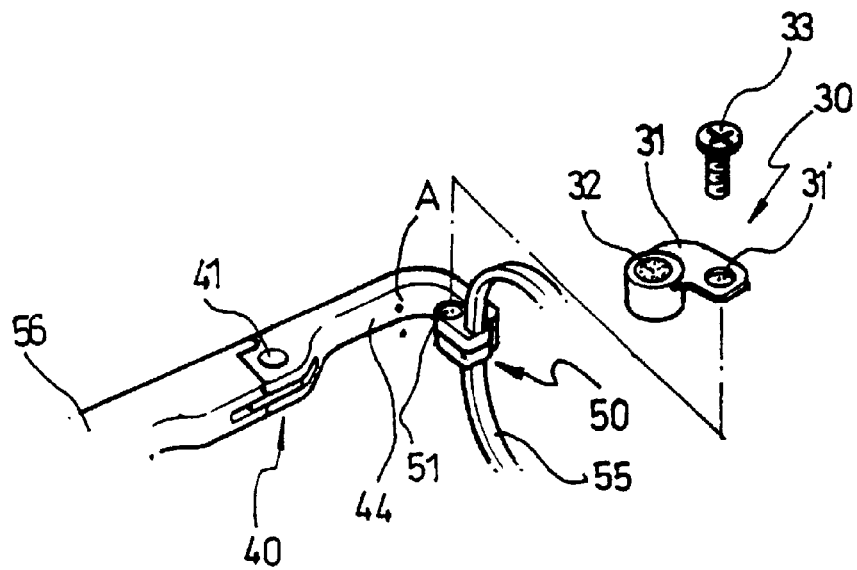
FIG. 2B is a perspective view of a structure for assembling auxiliary spectacles with main spectacles by means of magnetic clips according to another embodiment of the present invention, showing a state in which a magnetic clip is assembled with a frame clamp of the main spectacles.
Figure 3:
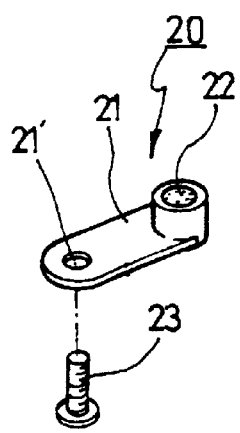
FIG. 3 is a perspective view of the magnetic clip employed in the structure shown in FIG. 2A.

In the structure for assembling auxiliary spectacles with main spectacles by means of magnetic clips according to the present invention as shown in FIGS. 2A and 2B, the magnetic clip 20 and 30, which has the construction as shown in detail in FIGS. 2A and 3, is assembled with general spectacles having lenses for correcting eyesight.

That is, the magnetic clip 20 and 30 has a shape of a plate with a short cylinder, so that the magnetic clip 20 and 30 can be easily fitted in a space A between a hinge section 40 and a frame clamp 50. The magnetic clip 20 and 30 includes an assembling arm 21 and 31, which has an assembling hole 21' and 31' formed through the assembling arm 21 and 31, and the first magnetic portion 22 and 32 integrated with the magnetic clip 20 and 30.

In this case, the shape of the magnetic clip 20 and 30 may be somewhat modified according to the shape of the space A and according to the position at which the magnetic clip 20 and 30 is assembled with the spectacles.

As shown in FIGS. 2A and 2B, the magnetic clip 20 and 30 may be assembled with the spectacles by means of an assembling screw 23 and 33 screwed through a hinge hole 41 or a frame clamp hole 51 formed through the hinge section 40 or the frame clamp 50.

First, as shown in FIG. 2A, the magnetic clip 20 is assembled with the hinge section 40 by means of the assembling screw 23 screwed through the assembling hole 21', the hinge hole 41 of the hinge section 40, and a temple of the spectacles. The magnetic clip 20 may have a relatively long appearance suitable for the space A. In contrast, as shown in FIG. 2B, the magnetic clip 30 is assembled with the frame clamp 50 by means of the assembling screw 33 screwed through the assembling hole 31' and the frame clamp hole 51 of the frame clamp 50. The magnetic clip 30 may have a shape which is somewhat bent according to the bent angle of a connector 44.

That is to say, it goes without saying that the magnetic clip 20 and 30 may have various modified shapes and constructions according to the shapes of the temples of spectacles, without departing from the scope of the present invention.

Further, in the structure for assembling auxiliary spectacles with main spectacles by means of magnetic clips according to the present invention, when the magnetic clip 20 and 30 is assembled with the hinge section 40 or the frame clamp 50, the assembling screw 23 and 33 may be completely screwed into the hinge hole 41 or the frame clamp hole 51, or may be screwed into the hinge hole 41 up to about one pitch before the completely screwed state, so that the magnetic clip 20 and 30 can slightly move. In the latter case, the position of the magnetic clip can be adjusted so that the magnetic clip can be seated in a stable manner within the space A regardless of the position of the first magnetic portion 22 and 32 formed at an end of the magnetic clip 20 and 30.

Figure 4A:
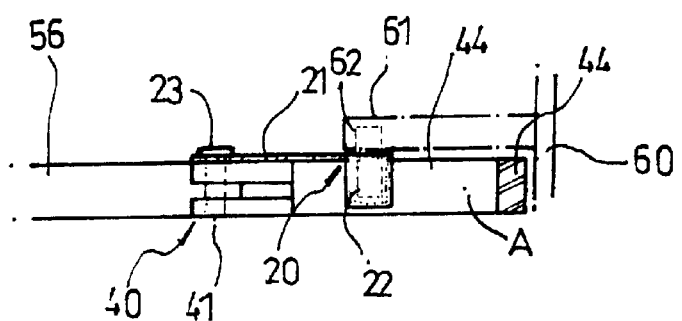
FIGS. 4A and 4B are side views of the magnetic clip shown in FIG. 3.
Figure 4B:
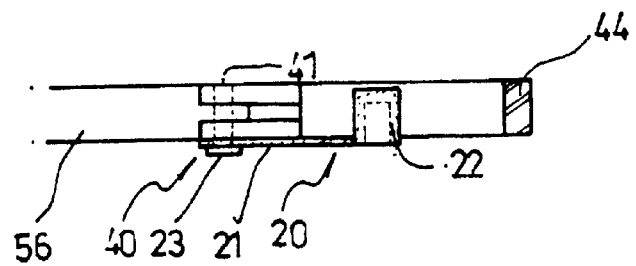

As shown in FIGS. 4A and 4B, which show an assembled construction between the magnetic clip 20 and the hinge section 40, the magnetic clip 20 may be assembled either on or beneath the hinge hole 41.

In this case, FIG. 2A is a perspective view of the magnetic clip 20 assembled on the hinge hole 41, and FIG. 3 contains a perspective view of the magnetic clip 20 assembled beneath the hinge hole 41.

The two magnetic clips assembled on and beneath the hinge hole 41 have similar shapes, excepting that the cylindrical magnetic portion 22 assembled beneath the hinge hole 41 has a height lower than the upper end of the connector 44 so as to prevent the first magnetic portion 22 from protruding upward beyond the upper end of the connector 44.

It is preferred that the first magnetic portion 22 and 32 a height not larger than a width of the temple 56 of the main spectacles, thereby preventing the first magnetic portion 22 and 32 from protruding vertically out of the temple 56.

When the magnetic clip 20 and 30 is fixed under the hinge section 40 or the frame clamp 50, the first magnetic portion 22 and 32 of the magnetic clip 20 and 30 can be exactly aligned with a magnetic attachment member 61 by adjusting the position to which the magnetic attachment member 61 of auxiliary spectacles 60 is attached.

Figure 5A:
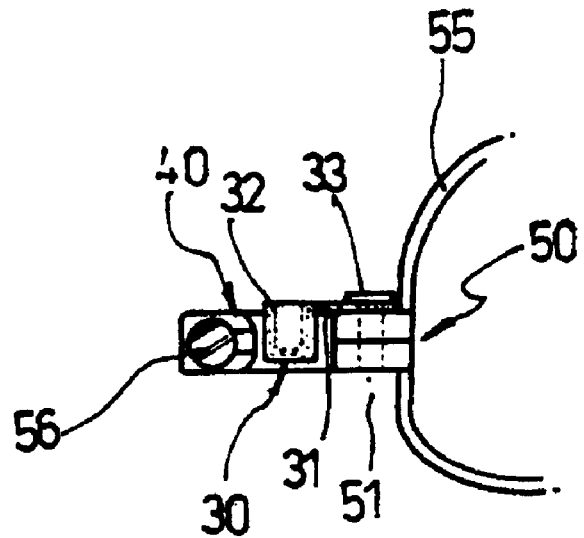
FIGS. 5A and 5B are side views of a magnetic clip assembled on and beneath a frame clamp of the main spectacles, which is employed in the structure shown in FIG. 2A.
Figure 5B:
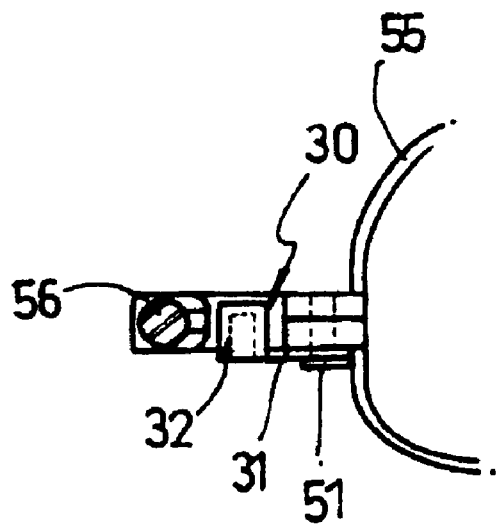

FIGS. 5A and 5B are side views of the magnetic clip 30 and the frame clamp 50 assembled with each other, similar to the magnetic clip 20 and the hinge section 40 assembled with each other.

Figure 6:
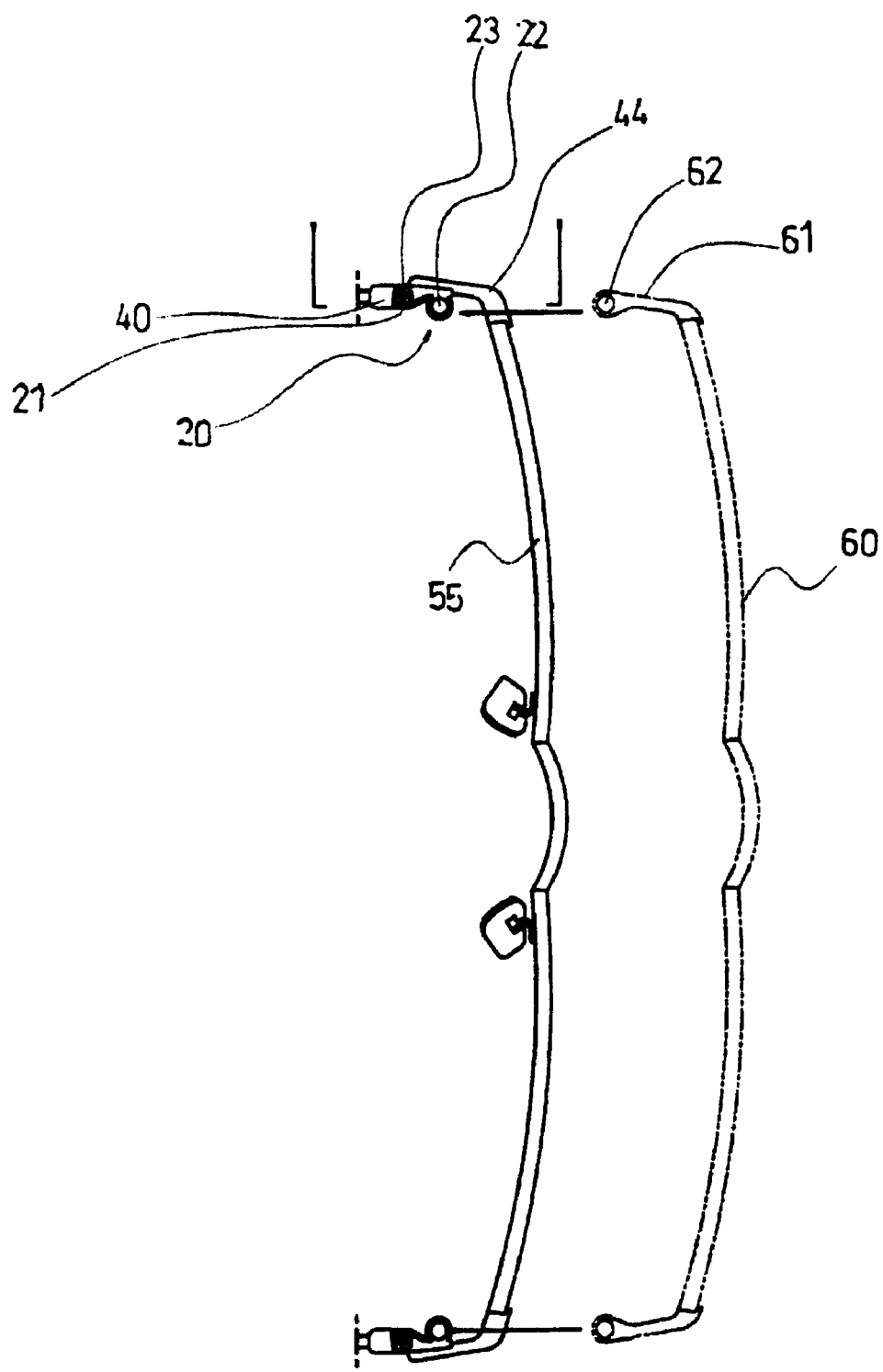
FIG. 6 is a plan view of double spectacles employing the structure shown in FIG. 2A.

FIG. 6 shows a method of attaching a second magnetic portion 62 of the magnetic attachment member 61 of the auxiliary spectacles 60 to the first magnetic portion 22 of the magnetic clip 20, from which it is noticed that the assembled double spectacles have a neat appearance.

Although FIG. 6 shows the attachment between the second magnetic portion 62 of the auxiliary spectacles 60 and the first magnetic portion 22 of the magnetic clip 20 assembled on or beneath the hinge hole 41 of the hinge section 40, the second magnetic portion 62 of the auxiliary spectacles 60 may be attached to the first magnetic portion 32 of the magnetic clip 30 assembled with the frame clamp 50 in the same way.

The structure for assembling auxiliary spectacles with main spectacles by means of magnetic clips according to the present invention enables usual spectacles to be converted to double spectacles, which can be used as sunglasses also, through a simple operation of attaching the auxiliary spectacles to the main spectacles.

Also, the structure for assembling auxiliary spectacles with main spectacles by means of magnetic clips according to the present invention has relatively a simple construction, thereby preventing the manufacture of the spectacles from being difficult and costly.

Further, in the structure for assembling auxiliary spectacles with main spectacles by means of magnetic clips according to the present invention, the first magnetic portion has a height not larger a width of the temple of the main spectacles, thereby enabling the magnetic attachment member of the sunglasses to be attached to the first magnetic portion in a stable manner, and improving the appearance of the spectacles to be neater by preventing the first magnetic portion from protruding vertically out of the temple.

The structure for assembling auxiliary spectacles with main spectacles by means of magnetic clips according to the present invention may be employed in all kinds of spectacles, on condition that the main spectacles and the auxiliary spectacles have similar dimensions, although they are of different types.

Moreover, in the structure for assembling auxiliary spectacles with main spectacles by means of magnetic clips according to the present invention, the auxiliary spectacles are not easily separated from the main spectacles, even when the temples of the main spectacles are widened beyond a certain limit, after the auxiliary spectacles are attached to the main spectacles.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A structure for assembling auxiliary spectacles with main spectacles by means of magnetic clips, the structure comprising:

at least a magnetic clip including a first magnetic portion and an assembling arm integrated with the first magnetic portion, the first magnetic portion containing a first magnet, the assembling arm having a first assembling hole formed through the assembling arm, the magnetic clip being assembled with the main spectacles by means of an assembling screw; and at least a magnetic attachment member having a first end, at which a second magnetic portion is disposed, and a second end integrated with the auxiliary spectacles, the second magnetic portion containing a second magnet, so that the auxiliary spectacles can be attached to the main spectacles by means of an attraction between the first magnet and the second magnet.

2. A structure for assembling auxiliary spectacles with main spectacles by means of magnetic clips as claimed in claim 1, wherein the magnetic clip is assembled one of positions on and under the hinge hole of the hinge section by means of the assembling screw, which is screwed through the first assembling hole and a hinge hole, the hinge hole being formed through a hinge section of a connector between a temple and a lens frame of the main spectacles.

3. A structure for assembling auxiliary spectacles with main spectacles by means of magnetic clips as claimed in claim 1, wherein the magnetic clip is assembled one of positions on and under the hinge hole of the hinge section by means of the assembling screw, which is screwed through the first assembling hole and a frame clamp hole, the frame hole being formed through a frame clamp of a connector between a temple and a lens frame of the main spectacles, the frame clamp clamping a lens frame of the main spectacles.

4. A structure for assembling auxiliary spectacles with main spectacles by means of magnetic clips as claimed in claim 1, wherein the first magnetic portion of the magnetic clip has a shape fitting to a space between the hinge section and the frame clamp, and the first magnetic portion has a height equal to or smaller than a width of the temple of the main spectacles, thereby preventing the first magnetic portion from protruding vertically out of the temple.

* * * * *